Nov. 22, 1960    S. MINNECI ET AL    2,961,508
PRESSURE RELAY FOR FLUID CONTAINING ENCLOSURES
Filed March 26, 1959
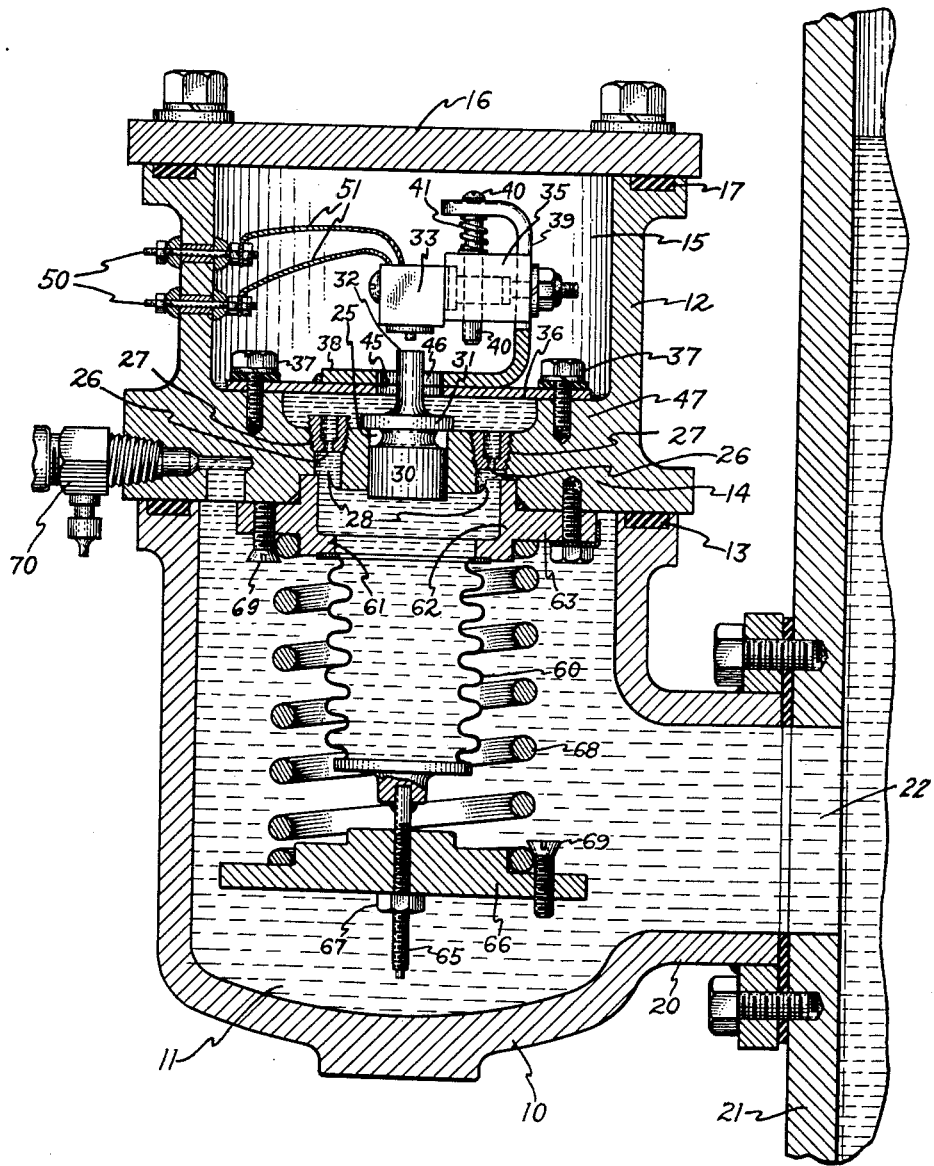
Inventors,
Kurt W. Eissmann,
Salvatore Minneci,
by Gilbert P. Tarleton
Their Attorney.

United States Patent Office 2,961,508
Patented Nov. 22, 1960

2,961,508

PRESSURE RELAY FOR FLUID CONTAINING ENCLOSURES

Salvatore Minneci, Pittsfield, and Kurt W. Eissmann, Dalton, Mass., assignors to General Electric Company, a corporation of New York Filed Mar. 26, 1959, Ser. No. 802,143

8 Claims. (Cl. 200—83)

This invention relates to protective devices for detecting a condition of excessive pressure rise in enclosures containing fluids, and more in particular to an improved pressure relay for detecting fault pressures in electrical apparatus of the type immersed in a fluid in a sealed enclosure. While the following disclosure relates primarily to the application of the pressure relay of our invention in the protection of electrical apparatus such as transformers, it will be obvious that our invention may also be employed in combination with other types of enclosures containing fluids and subject to rapid pressure rises, without departing from the spirit or scope thereof.

Electrical transformers of one type are comprised of a coil and core structure immersed in an insulating liquid within a sealed casing. In this type of transformer, a gas space is frequently provided above the surface of the liquid in order to provide space for the expansion and contraction of the liquid with temperature variation. The temperature of the liquid may vary as a result of normal variations in load on the electrical apparatus, as well as ambient temperature conditions, and these normal thermal variations result in corresponding normal changes in the pressure of the gas and liquid within the enclosure. An electrical fault in the apparatus, however, such as the breakdown of insulation and the formation of an electric arc, will cause evolution of additional gas within the enclosure, and a consequent abnormal increase in pressure within the enclosure.

In the past, a number of schemes have been employed for the detection of abnormal increases in the pressure within the enclosure in order, for example, that the transformer may be disconnected from its circuit before excessive damage has resulted from the fault. One type of such device was sensitive only to the absolute pressure within the enclosure. When this type of device was employed, it was necessary to take into consideration the fact that the pressure within the casing increases as the transformer warms up in the course of normal operation due to the expansion of the liquid. As this is a perfectly normal condition, it was necessary to adjust the device to indicate a fault pressure only when the pressure within the enclosure appreciably exceeded the maximum value of normal pressure within the enclosure. With this arrangement, it was possible that a fault may occur at a time when the pressure within the enclosure was substantially less than the maximum normal value, and a serious delay in the detection of the fault would thereby result since the fault would not be indicated until the pressure within the enclosure had built up to a value in excess of the maximum normal pressure.

In order to overcome this difficulty, other types of protective devices were provided that were responsive to the rate of increase in pressure within the enclosure. In one device of this type, a collapsible bellows was provided for actuating the contacts in a protective circuit. The bellows had a small opening in one end and was mounted inside the casing enclosing the transformer above the liquid level. Under normal operating conditions there is a gradual interchange of gas between the inside and the outside of the bellows to equalize the pressure therebetween. As long as the pressure on the opposite sides of the bellows was the same, no movement of the bellows resulted. However, upon any sudden increase in pressure the bellows was compressed to cause engagement of the contacts. Thus, the operation of the pressure operated switch was dependent upon the rate of change in pressure within the enclosure.

In order to obtain sufficient sensitivity to rate of pressure rise with the latter type of device, the opening or orifice in the bellows was required to be impracticably minute, since the operation of the device required the passage of a gas though the orifice. This resulted in difficulty in calibration of the device. Since the operation of the device required the use of a compressible fluid within the bellows, replacement of the gas by a liquid would have resulted in an inoperable device.

It is therefore an object of this invention to provide an improved pressure indicating device for determining the occurrence of excessive rates of pressure increase in an enclosure containing a fluid.

Another object of this invention is to provide an improved fault pressure relay for transformers or other fluid immersed electrical apparatus which will respond only to abnormal increases in pressure such as may be caused by a fault in the apparatus.

Still another object of this invention is to provide a fault pressure relay for detecting adbnormal rates of pressure increased in transformers or other fluid immersed electrical apparatus, the relay being characterized by the fact that its calibration is not dependent upon the passage of a gaseous material through an equalizing orifice.

A still further object of this invention is to provide a sensitive economical fault pressure relay for indicating the occurrence of excessive rates of pressure increase in transformers or other fluid immersed electrical apparatus, wherein the relay does not rely for its operation upon the use of compressible material in the pressure sensitive device.

In accordance with the invention, we provide a pressure responsive relay for detecting a predetermined rate of change of pressure in an enclosure. The enclosure may be of the type containing a liquid, such as for example, a transformer immersed in a dielectric fluid such as transformer oil. The relay comprises a pressure responsive bellows for exerting a force proportional to the pressure in the enclosure upon a confined volume of liquid. A piston means movable in response to the pressure in the volume of liquid is provided, and an electric switch is mounted in such a position to be actuated by a movement of the piston means. Orifice means are provided bypassing the piston means, so that the resultant pressure in the liquid, and hence the force on the piston means, is proportional to the rate of change of pressure in the enclosure.

In a more specific embodiment of the invention, the relay comprises a pair of chambers, one mounted above the other, with a horizontal wall separating the chambers. A spaced apart cylinder and orifice means are provided extending through the wall, and a piston is provided in the cylinder. A metallic bellows is provided in the lower chamber. The bellows has an upper open end covering the cylinder and orifice, and a closed lower end. The lower chamber is connected by suitable means to the fluid of the electrical apparatus, so that the external surface of the bellows is surrounded by the fluid of the apparatus. A second liquid is provided completely filling the bellows and partially filling the upper chamber. A switch, preferably mounted in the upper chamber, is positioned above the piston and is adapted to be actuated by movement of the piston.

While the specification concludes with claims particularly pointing out and distinctly claiming the subject matter which we regard as our invention, it is believed that the invention will be better understood from the following description taken in connection with the accompanying drawing.

The drawing illustrates a cross-sectional view of a fault pressure relay according to one embodiment of the invention.

Referring now to the drawing, therein is illustrated a fault pressure relay comprising a lower casing 10 defining a generally cylindrical lower chamber 11. The upper end of the lower casing 10 is open, and an upper casing 12 is provided mounted above the lower casing 10 and covering the open upper end of the lower casing. The upper casing 12 is held rigidly on the top of the lower casing by any convenient means, such as bolts (not shown), and sealing means such as a gasket 13 disposed in an annular groove in the upper end of the lower casing 10 are provided to prevent escape of liquid from the lower chamber. The upper casing 12 has a bottom wall designated generally by the numeral 14 separating the lower chamber 11 from an upper chamber 15 defined by the walls of the upper casing 12. The upper end of the upper casing 12 may also be open to permit access to the components disposed in the upper chamber, and a cover 16 is provided over the upper opening in the upper casing 12. The cover 16 may be bolted or otherwise rigidly affixed to the casing 12, and sealing means such as a gasket 17 disposed in an annular groove in the upper edges of the casing 12 may be provided to seal the upper chamber 15.

The lower casing 10 is provided with generally horizontal flanged extension 20 adapted to be bolted or otherwise rigidly affixed to the wall 21 of an enclosure, such as the tank of a transformer. The flanged extension 20 surrounds an aperture 22 in the wall 21 so that liquid may communicate between the lower chamber 11 and the enclosure by way of the flange extension 20 and aperture 22.

The bottom wall 14 of the upper casing 12 is provided with a centrally disposed cylinder 25 extending therethrough. One or more orifices 26 are also provided extending through the wall 14. As illustrated in the drawing, the dimensions of the orifices 26 may be more accurately controlled if the orifices 26 are provided extending through plugs 27 threaded in apertures 28 in the wall 14.

A piston 30 is provided in the cylinder 25, the piston being adapted for generally vertical movement in the cylinder. In order to prevent the piston 30 from dropping through the cylinder 25, the piston may be provided with a central portion 31 having a larger diameter than the bore of the cylinder, so that the portion 31 of the piston may rest on the bottom wall 14 of the casing 12. The piston 30 may also be provided with an upwardly extending projection 32, and a switch 33 is disposed above the projection 32 and spaced therefrom. The switch 33 is adapted to be mechanically operated by the projection 32 upon upward movement of the piston 30.

The switch 33 is preferably mounted resiliently above the piston 30 in order that the switch is not damaged by shock due to the rapid upward movement of the piston 30. For example, the switch 33 may be bolted to a block member 35. A plate member 36 is bolted by means of bolts 37 to the bottom wall of the casing 12. A U-shaped frame member 38 is provided with one arm rigidly affixed, such as by welding, to the frame member 36, the other arm of the U-shaped member 38 extending over the block member 35. The block member 35 is guided for vertical movement in suitable slots in the vertical portion 39 of the U-shaped frame member 38, and a pin 40 extends from the upper horizontal portion of the frame member 38 downwardly through the block 35. The pin member 40 is rigidly affixed in the frame member 38, and slidably extends through the block 35. A spring 41 between the upper horizontal portion of the frame member 38 and the block 35 biases the block 35 downwardly. The guiding slots in the frame member 38 may serve also to limit the downward movement of the block member 35. The plate member 36 and the frame member 38 may be provided with apertures 45 and 46 respectively to permit passage of the projection 32 to contact the switch, and also to permit free passage of fluid throughout the chamber 15. In order that the plate member 36 does not block the orifices in the bottom of the casing 12, the plate 36 may be mounted on an annular boss 47 on the bottom wall of the casing 12.

External connections to the switch 33 may be made by any convenient means, such as by means of bushings 50 extending through the side wall of the casing 12. The inner sides of the bushings 50 are connected by means of leads 51 to the switch 33.

A metallic bellows 60 is provided within the lower chamber 11. The lower end of the bellows 60 is closed, and the upper open end of the bellows is affixed to the underside of the bottom wall 14 of the upper casing 12, so that it covers the cylinder 25 and the orifices 26. In order to facilitate the assembly of the bellows 60 to the wall 14, the upper end of the bellows member 60 may be brazed or otherwise sealed to inwardly extending the flanges 61 of an annular support member 62. Outwardly extending flanges 63 of the annular support 62 may then be bolted directly to the bottom of the wall 14.

The bellows 60 and lower portion of the chamber 15 are filled with a liquid that will be disclosed in more detail in the following paragraphs.

A stud 65 may be provided extending downwardly from the bottom of the bellows 60. The stud 65 extends downwardly through a spring retaining plate 66, and an adjustable nut 67 is provided on the stud beneath the plate 66 to limit the downward movement of the plate 66 with respect to the bellows. A helical spring 68 is provided surrounding the bellows 60 and extending between the annular support 62 and the spring retaining plate 66. Concentricity of the spring with respect to the bellows 60 may be maintained by means of ridges in the support 62 and spring retaining member 66, and the ends of the spring 68 may be held by means of several bolts 69 extending through the spring retaining member 66 and support 62.

The pressure relay of the invention is mounted on the wall 21 of the enclosure below the surface of the liquid within the enclosure, so that the liquid of the enclosure entirely fills the lower chamber 11. In order to permit removal of gas from the lower chamber 11, for example when the pressure relay is initially installed on the tank 21, a suitable valve 70 may be provided communicating with the uppermost portion of the chamber 11.

Assuming that the wall 21 forms a part of the enclosure for a transformer, and that the transformer is immersed in the liquid within the enclosure, normal variations in load on a transformer and ambient temperature will result in variation in temperature of the enclosure liquid. Since the enclosure is sealed, these thermal variations will result in variation in pressure within the enclosure. This variation in pressure is also transmitted to the liquid within the lower chamber 11. Assuming that the pressure within the enclosure is increasing at a normal rate, the increase in pressure within the lower chamber 11 will provide a force on the external surfaces of the bellows 60 tending to raise the lower end of the bellows. This results in the forcing of the liquid within the bellows upwardly through the orifices 26 and into the upper chamber 15. The orifices 26 are sufficiently large that with normal increases in pressure in the enclosure the pressure within the bellows will not increase sufficiently to effect vertical movement of the piston 30.

In the event of a fault in the transformer, such as a breakdown of insulation and resultant arcing, the pressure within the enclosure will rise at a very rapid rate as a result of the formation of gaseous products of decomposition in the liquid. This rapid pressure increase in the liquid is transmitted to the liquid in the chamber 11, and results in a rapid increase in the force tending to collapse the bellows 60. Since the orifices 26 at the open end of the bellows are of sufficient size only to by-pass the piston 30 with normal increases in pressure, the pressure within the bellows 60 rapidly attains sufficient magnitude to force the piston 30 upwardly. Upon upward movement of the piston 30, the projection 32 engages the switch 33 to effect the operation of the switch. The switch 33 may be connected by way of leads 51 and bushings 50 to any conventional indicating or protective circuit, for example such as a circuit breaker to disconnect the transformer from service. The sensitivity of the pressure relay may be adjusted by varying the length of the helical spring 68 by means of the nut 67. This adjustment varies the force of the spring 68 opposing the collapse of the bellows 60. With this arrangement, high sensitivity of the device to rates of pressure increase may be obtained regardless of the head of liquid in the enclosure.

Since a liquid is employed in the bellows 60 and upper chamber 15 instead of a gas, the dimensions of the orifices 26 are not extremely critical. While other materials may be employed for the liquid within the bellows 60, it is preferred to employ a material such as silicone oil having a low variation of viscosity with ambient temperature in order that the operation of the device be consistent with variations in temperature. The fluid in the lower chamber 11 is preferably the same fluid as in the enclosure, and in the case of a transformer may, for example, be oil.

By employing a piston in combination with a bellows, by-passing the piston with orifices, and employing a liquid material within the bellows, the present invention has provided a fault pressure relay that has high sensitivity to rate of pressure rise within a liquid containing enclosure. Thus, since the area of the cylinder 25 is much smaller than the surface area of the bellows, a mechanical advantage is obtained whereby small movements of the bellows at a rapid rate will effect the movement of the piston, and consequent operation of the switch 33. As an example, in one pressure relay constructed according to the invention, the relay operated the switch at a pressure rise rate of 0.53 pound per square inch per second.

While the invention has been specifically disclosed with reference to a device responsive to rate of change in liquid pressure, it may also be employed to respond to pressure changes in gaseous filled apparatus, in which case the lower chamber is filled with the gas of the apparatus. Thus, the protective device of the invention may be employed either above or below the liquid level in a transformer of the type having a gas cushion above the liquid. It is preferred, however, to employ it below the liquid level in order to provide a more sensitive response, since in this case it will respond to pressure shock waves as they propagate directly through the liquid without the cushioning effect resulting from passing through a gas.

It will be understood, of course, that while the form of the invention herein shown and described constitutes the preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and is aimed in the appended claims to cover all such changes that fall within the true spirit and scope of the invention.

What we claim as new and desire to secure by Letters Patent of the United States is:

1. A pressure responsive relay for detecting a predetermined rate of change of fluid pressure in an enclosure, said relay comprising pressure responsive bellows means for exerting a force proportional to the pressure in said enclosure upon a confined volume of liquid, piston means movable in response to the pressure in said volume of liquid, an electric switch adapted to be actuated by movement of said piston means, and there being orifice means by-passing said piston means so that the resultant pressure in said confined volume of liquid acting on said piston means is proportional to the rate of change of pressure in said enclosure.

2. A protective device responsive to rate of pressure change in an enclosure containing a fluid comprising first and second chambers, wall means separating said chambers, said first chamber communicating with said fluid, bellows means having an open end affixed to said wall means and a closed end extending into said first chamber, a cylinder extending through said wall between said bellows means and said second chamber, a piston in said cylinder, there being an orifice extending through said wall between said bellows means and said second chamber, a liquid filling said bellows means, said orifice providing a path for said liquid to bypass said piston on rapid increases in pressure in said enclosure, and switch means in said second chamber operably disposed with respect to said piston.

3. A protective device responsive to the rate of pressure change in an enclosure containing a fluid comprising a first chamber, a second chamber disposed above said first chamber and separated therefrom by a horizontal wall, spaced apart cylinder and orifice means extending through said wall, a piston in said cylinder, bellows means on said wall having an open end covering said cylinder and orifice means and a closed end extending downwardly into said first chamber, a liquid filling said bellows means and partially filling said second chamber, said first chamber communicating with said fluid in said enclosure and being filled with said fluid and switch means disposed above said piston and being operable thereby.

4. A protective device responsive to increase in the rate of pressure change in an enclosure containing a first liquid comprising a first sealed chamber, a second chamber disposed above said first chamber and separated therefrom by a horizontal wall, spaced apart cylinder and orifice means extending through said wall between said chambers, a piston in said cylinder adapted for generally vertical movement, means preventing said piston from passing downwardly through said cylinder into said first chamber, bellows means mounted on said wall and having an upper open end covering said cylinder and orifice means and a lower closed end extending into said first chamber, a second liquid filling said bellows means and partially filling said second chamber, said first chamber communicating with the liquid in said enclosure and being filled with said first liquid, and switch means mounted within said second chamber above said piston and adapted to be operable upon vertical movement of said piston.

5. A portective device responsive to the increase in pressure in an enclosure containing a first liquid comprising a first chamber, a second chamber disposed above said first chamber and separated therefrom by a horizontal wall sealing said first chamber, spaced apart cylinder and orifices means extending through said wall, a piston in said cylinder, means preventing said piston from passing downwardly through said cylinder and into said first chamber, bellows means mounted on the underside of said wall and having an open end covering said cylinder and orifice means and a closed end extending downwardly into said first chamber, helical spring means surrounding said bellows means, adjustable spring retaining means on the lower end of said bellows means, said spring means extending between the underside of said wall and said spring retaining means, a second liquid filling said bellows means and partially filling said second chamber, said first chamber communicating with said first liquid in said enclosure and being filled with said first liquid, and switch means disposed above said piston in said second chamber and being operable upon a vertical movement of said piston.

6. A protective device responsive to increases in the rate of pressure variation in an enclosure containing a first liquid comprising a first chamber, a second chamber disposed above said first chamber and separated therefrom by a horizontal wall sealing said first chamber, spaced apart cylinder and orifice means extending vertically through said wall between said chambers, a piston in said cylinder, means preventing said piston from passing downwardly into said cylinder into said first chamber, bellows means mounted on the underside of said wall and having an open end covering said cylinder and orifice means and a closed end extending downwardly into said first chamber, spring retaining means adjustably mounted on the lower closed end of said bellows, helical spring means surrounding said bellows and extending from the underside of said wall to said spring retaining means, a second liquid filling said bellows means and partially filling said second chamber, said first chamber communicating with the liquid in said enclosure and being filled with said first liquid, and switch means resiliently mounted within said second chamber above said piston, said switch means being adapted to be operated upon vertical movement of said piston resulting from rapid increase in the pressure in said second liquid within said bellows.

7. The protective device of claim 6 in which said second liquid is a material having a low variation in viscosity with variations in ambient temperature.

8. A pressure responsive relay device for detecting a pressure rise in a fluid containing enclosure when the rise exceeds a predetermined rate, said device comprising first and second chambers separated from each other by a wall, said first chamber communicating with said enclosure and being filled with fluid from said enclosure, resilient means having an open end and a closed end in said first chamber, the open end of said resilient means being sealingly attached to said wall, a liquid filling said resilient means, a piston passing through an opening in said wall and having one end thereof in contact with said liquid and the other end thereof extending into said second chamber, said piston reciprocating in response to changes in pressure of said liquid, switch means in said second chamber located in the path of movement of said piston other end, said switch means being actuated on contact with said piston other end, there being a liquid bypass opening in said wall, said bypass opening inhibiting reciprocation of said piston by providing a path for said liquid to gradually flow from said first chamber to said second chamber when gradual increases in the pressure of said fluid cause gradual compression of said resilient means, but the size of said liquid bypass opening being such that upon a pressure rise in said fluid containing enclosure that exceeds said predetermined rate said liquid will be prevented from bypassing said piston rapidly enough to inhibit reciprocation thereof, whereby said piston other end will advance and contact said switch means causing actuation thereof.

References Cited in the file of this patent
UNITED STATES PATENTS

| | | |
|---|---|---|
| 2,411,577 | Leslie | Nov. 26, 1946 |
| 2,421,284 | Peterson | May 27, 1947 |
| 2,716,395 | Pettigrew et al. | Aug. 30, 1955 |
| 2,758,480 | Zeller | Aug. 14, 1956 |
| 2,852,642 | Cromwell | Sept. 16, 1958 |